United States Patent
Sang et al.

(10) Patent No.: US 7,310,526 B2
(45) Date of Patent: Dec. 18, 2007

(54) LOAD-AWARE HANDOFF AND SITE SELECTION SCHEME

(75) Inventors: Aimin Sang, Princeton, NJ (US); Xiaodong Wang, New York, NY (US)

(73) Assignee: NEC Laboratories America, Inc., Princeton, NJ (US)

(*) Notice: Subject to any disclaimer, the term of this patent is extended or adjusted under 35 U.S.C. 154(b) by 82 days.

(21) Appl. No.: 10/838,792

(22) Filed: May 4, 2004

(65) Prior Publication Data
US 2005/0176440 A1 Aug. 11, 2005

Related U.S. Application Data

(60) Provisional application No. 60/542,466, filed on Feb. 6, 2004.

(51) Int. Cl.
*H04Q 7/20* (2006.01)

(52) U.S. Cl. .................. 455/436; 455/453; 455/437

(58) Field of Classification Search ............... 455/437, 455/525, 436, 442, 450, 453, 439; 370/331
See application file for complete search history.

(56) References Cited

U.S. PATENT DOCUMENTS

| | | | |
|---|---|---|---|
| 5,754,959 A * | 5/1998 | Ueno et al. ............... 455/453 |
| 6,381,458 B1 * | 4/2002 | Frodigh et al. ........... 455/442 |
| 6,438,116 B1 * | 8/2002 | Corbett .................... 370/331 |
| 6,445,924 B1 * | 9/2002 | Rasanen ................... 455/437 |
| 6,615,044 B2 * | 9/2003 | Tigerstedt et al. ........ 455/437 |
| 6,714,784 B1 * | 3/2004 | Forssell et al. ........... 455/436 |
| 6,760,599 B1 * | 7/2004 | Uhlik ....................... 455/525 |
| 6,947,748 B2 * | 9/2005 | Li et al. ................... 455/450 |
| 6,954,643 B2 * | 10/2005 | Petrus ...................... 455/437 |
| 2003/0176192 A1 * | 9/2003 | Morimoto et al. ........ 455/453 |

OTHER PUBLICATIONS

Bender, P. et al., "CDMA/HDR: A Bandwidth-Efficient High-Speed Wireless Data Service for Nomadic Users", IEEE Communications Magazine, Jul. 2000.

3GPP Technical Report 25.950 V.4.0.0 (Mar. 2001), "3rd Generation Partnership Project: Technical Specification Group Radio Access Network; UTRA High Speed Downlink Packet Access (Release 4)" 2001.

Soong, A.C.K. (Ericsson), "Summary of the Cell Selection Ad Hoc Group", 3GPP2/TSG-C30-20020311-020, Mar. 2002.

Li, J. (Nortel Networks), "Update for Cell Switching Protocol", 3GPP2 TSG-C Working Group 3, Mar. 2002.

Knisely, D. et al. (Lucent Technologies), "Requirements for Cell Switching in 1x-EVDV", 3GPP2 TSG-C WG3, Kobe, Japan, Mar. 2002.

Gaal, P. (Qualcomm Incorporated), "Cell Switch Detection Performance Comparison", 3GPP2-C30-20020311-014, Kobe, Japan, Mar. 2002.

Gholmieh, A. et al. (Qualcomm Incorporated), "Cell Selection Discussion", C30-20020311-009 QCOM Cell Selection Method. doc, Kobe, Japan, Nov. 2003.

(Continued)

*Primary Examiner*—Joseph Feild
*Assistant Examiner*—Kiet Doan

(57) ABSTRACT

The present invention is directed to a distributed approach to handoff and cell site selection that takes into account the load dynamics in a multi-cell system.

5 Claims, 10 Drawing Sheets

OTHER PUBLICATIONS

Motorola, "Fast Cell Selection and Handovers in HSDPA", TSG-RAN Working Group, R2-A010017, Jan. 2000.

Das, S. et al., "Dynamic Load Balancing Through Coordinated Scheduling in Packet Data Systems", IEEE Infocom, Apr. 2003.

3GPP TS 25.3098 V5.2.0 (Mar. 2002) Technical Specification, 3rd Generation Partnership Project; Technical Specification Group Radio Access Network; High Speed Downlink Packet Access (HSDPA); Overall Description, Stage 2, (Release 5), Mar. 2002.

Andrew, M. et al., "Providing Quality of Service over a Shared Wireless Link", IEEE Communications Magazine, Feb. 2001.

Hanly, S.V., "An Algorithm for Combined Cell-Site Selection and Power Control to Maximize Cellular Spread Spectrum Capacity", IEEE Journal on Selected Areas in Communications, vol. 13, No. 7, Sep. 1995.

Yates, R.D. et al., "Integrated Power Control and Base Station Assignment", IEEE Transactions on Vehicular Technology, vol. 44, No. 3, Aug. 1995.

3GPP2 C.S0024 Version 3.0, "cdma2000 High Rate Packet Data Air Interface Specification", table of contents and pp. 1-1 through 1-18, Dec. 2001.

* cited by examiner

LOAD-AWARE HANDOFF AND SITE SELECTION SCHEME

This Utility Patent Application is a Non-Provisional of and claims the benefit of U.S. Provisional Patent Application Ser. No. 60/542,466, entitled "LOAD-AWARE HANDOFF AND SITE SELECTION SCHEME," filed on Feb. 6, 2004, the contents of which are incorporated by reference herein.

BACKGROUND OF INVENTION

The invention relates to wireless communication networks, and, more particularly, to handoff and site selection schemes in a wireless communication network.

Advanced third-generation (3G) and beyond wireless communication systems—such as the WCDMA High Speed Data Packet Access (HSDPA) system, Qualcomm's High Data Rate (HDR) system, or systems based on the CDMA2000 standard—are capable of supporting high-speed downlink packet services. See, e.g., 3GPP Technical Specification 25.308 version 5.2.0, "High Speed Downlink Packet Access (HSDPA): Overall description," March, 2002; P. Bender et al., "CDMA/HDR: a bandwidth-efficient high-speed wireless data service for nomadic users," IEEE Commun. Mag., pp. 70-77, July, 2000; 3GPP2 C.S0024 Version 3.0, CDMA2000 High Rate Packet Data Air Interface Specification, December, 2001. Such systems can take advantage of recent advances in opportunistic downlink scheduling algorithms, which exploit the asynchronous peaks of the fading channels of multiple mobile stations within a cell where a time-slotted downlink shared data channel is deployed. Unfortunately, the proposed scheduling algorithms have focused on the effect on individual cells, and little study has been devoted to multi-cell systems where inter-cell interference and asymmetric traffic arrival may be a major hindrance to higher resource utilization and better robustness.

Existing handoff and cell site selection schemes have mainly been developed for traditional multi-cell cellular systems, where each mobile station has a dedicated downlink channel from the base station. See, e.g., 3GPP Technical Report 25.950 v4.0.0, "UTRA High Speed Downlink Packet Access," 3GPP, 2001; A. C. K. Soong, Ericsson, "Summary of the Cell Selection Ad Hoc Group," TSC-C Working Group, 3GPP2/TSG-C30-20020311-020, 3GPP2 Cell Selection Ad Hoc Group, March, 2002; A. Gholmieh, P. Gaal, Qualcomm, "Cell Selection Discussion, QCOM Cell Selection Method," TSG-C Working Group, 3GPP2/C30-20020311-009, 3GPP2 Cell Selection Ad Hoc Group, March, 2002; J. Li, Nortel Networks, "Update for Cell Switching Proposal," TSG-C Working Group, 3GPP2/C30-20020311-015, 3GPP2 Cell Selection Ad Hoc Group, March, 2002; D. Knisely, S. Basudeban, Y. Yang, Lucent, "Requirements for Cell Switching in 1x-EVDV," TSG-C Working Group, 3GPP2/C30-20020311-008, 3GPP2 Cell Selection Ad Hoc Group, March, 2002; Motorola, "Fast Cell Selection and Handovers in HSDPA," TSG-RAN Working Group, R2-A010017, January, 2000. These prior art schemes typically consider only physical-layer channel quality and may potentially cause local congestion and high blocking rates in a system providing high-speed packet access.

It has recently been proposed that adding a centralized scheduler to a multi-cell system can be used to coordinate scheduling and load balancing. See S. Das et al., "Dynamic Load Balancing through Coordinated Scheduling in Packet Data Systems," in Proc. IEEE INFOCOM, April, 2003. The central scheduler would determine the optimal base station-mobile station binding through periodic searching of a complete list of all the possible bindings. The list of static bindings would be sorted by radio distance (SINR) and the decision would be refined iteratively according to a threshold defined by the SINR based bindings. The dynamic binding across the system, together with independent scheduling within each cell, is referred to as "two-tier scheduling."

SUMMARY OF INVENTION

The present invention is directed to a distributed approach to handoff and cell site selection that takes into account the load dynamics in a multi-cell system. In accordance with an aspect of the invention, a mobile station in a multi-cell system makes a measurement of throughput from the serving base station, if any, and/or an estimate of throughput from each candidate base station utilizing load information provided by each base station. For example, an estimate can be made by each mobile station of the mean channel rate divided by the number of mobile stations from each base station. The load information can be, for example and without limitation, a computation reflecting the number of existing mobile stations within the corresponding cells and can be broadcast by a base station periodically through a pilot or signal channel. The mobile station then chooses the base station providing the highest throughput as its (new) serving base station. This selection can be made through signaling at the very beginning of a new mobile station's arrival, referred to herein as load-aware cell site selection, or can be executed periodically by a mobile station as part of what is referred to herein as a load-aware handoff procedure. Thus, the present invention enables the mobile station handoff and the mobile station-base station binding to be determined in a distributive and asynchronous manner based on independent measurements of real-time load and per-user throughput.

The present invention can take advantage of system-level information as well as physical-layer information, without requiring a central scheduler to search a list of all possible mobile station-base station bindings, which may not be scalable. The present invention advantageously enables a multi-cell system supporting high-speed packet access to be more robust to dynamic and asymmetric load distribution across the whole system. It can potentially reduce regional congestion and the blocking rate without extra resource requirements, thereby allowing the system to accommodate more satisfied users. Moreover, the present invention is more scalable than centralized solutions and also requires little change to existing architectures.

These and other advantages of the invention will be apparent to those of ordinary skill in the art by reference to the following detailed description and the accompanying drawings.

BRIEF DESCRIPTION OF DRAWINGS

FIG. 4 shows the load balancing effect. FIG. 5 shows the accumulated number of load-aware handoff.

DETAILED DESCRIPTION

Figure 1:
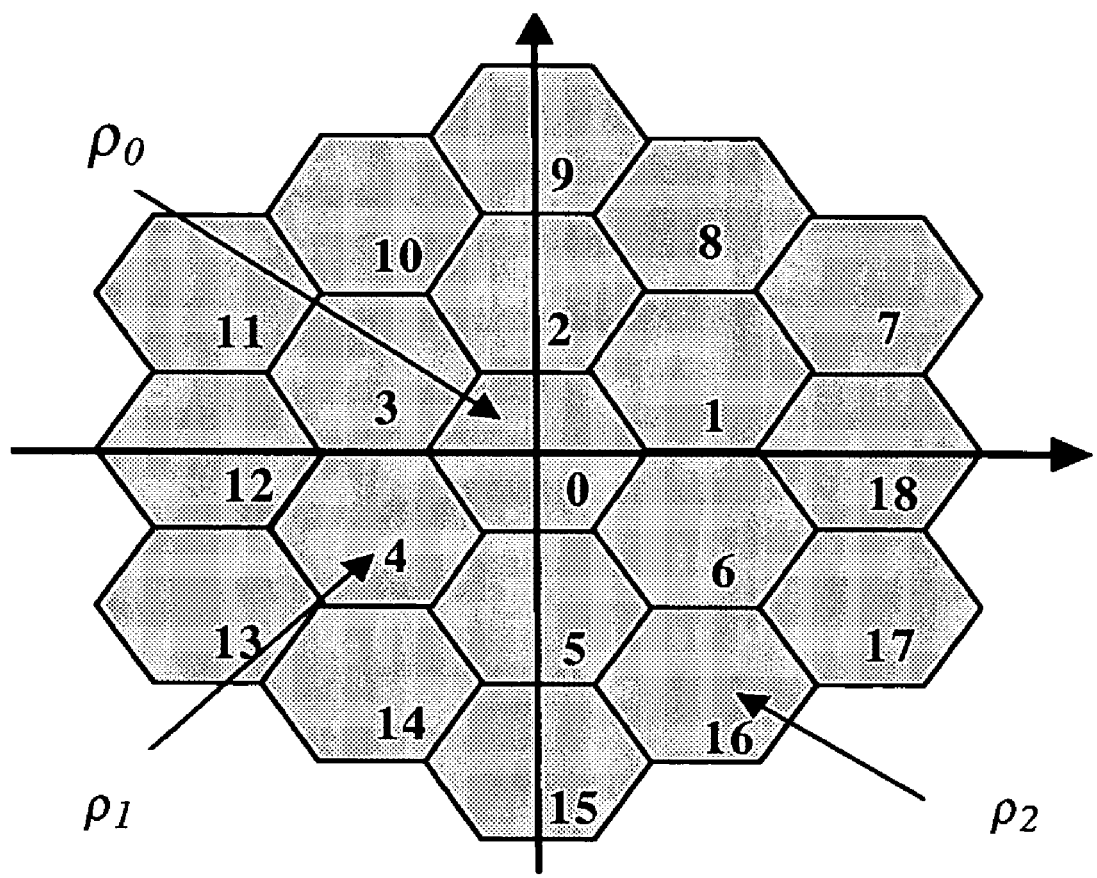
FIG. 1 is a diagram of an illustrative three-tier multi-cell system.

FIG. 1 is a diagram of an illustrative three-tier hexagonal multi-cell system. For purposes of illustration only, the system is assumed to provide packet data services with minimum rate guarantees for a WCDMA High Speed Downlink Packet Access (HSPDA) or CDMA2000 1xEV-DO/DV system or the like.

The mobile stations (MSs) are assumed to be any type of device that can be used to communicate in the multi-cell system, for example and without limitation, cellular telephones, notebook computers, personal digital assistants or any other type of device (whether mobile or fixed, although preferably mobile) with an appropriate interface for the particular wireless link technology utilized. The device should have sufficient memory and processing capabilities to participate in the herein-described handoff and cell site selection procedures.

It is assumed, for purposes of discussion and without limitation, that the scheduling mechanism within each cell at each base station is time-division multiplexing (TDM) based. Thus, within each cell, there is a TDM shared channel. A base station (BS) comprises a scheduler that uses periodic channel state information (CSI) feedback from each mobile station (MS) to help its decision on allocating time slots to different users. Each new or existing MS receives a pilot channel signal broadcast by the base stations at different cells and measures the CSI or channel signal strength. The scheduling algorithm in each cell is selected so as to guarantee the minimum rate requirement of each MS. It also can control the intra-cell performance in terms of aggregate downlink throughput and fairness. See U.S. Utility patent application Ser. No. 10/731,962, "SCHEDULING METHOD WITH TUNABLE THROUGHPUT MAXIMIZATION AND FAIRNESS GUARANTEES IN RESOURCE ALLOCATION," filed on Dec. 10, 2003, the contents of which are incorporated by reference herein. In addition, each base station can also run an admission control algorithm to decide whether it can accept a new MS or MS switchover. This procedure assists in maintaining the minimum rate guarantee for each individual MS.

Within a single cell, at each time slot, a BS may exclusively transmit to only one user selected by the intra-cell opportunistic scheduling algorithm. All of the transmission power of the BS, a residue after handling dedicated channels, is devoted to transmission to this user. In doing so the system avoids intra-cell interference to a great extent, but it leaves little space to inter-cell interference mitigation and multi-cell load balancing.

The system can be advantageously modeled as follows. $\rho_i=\lambda_i/\mu$ denotes the traffic load of tier i; $\lambda_i$ is the Poisson arrival rate of MSs at any cell of tier i; $1/\mu$ is the exponential life time of all MSs. The initial position of MS arrivals is uniformly distributed within the hexagonal range of each cell. In such a system of high-speed downlink shared channel, cell site selection means that each newly arrived MS will be bound to exactly one serving BS. Based on signal and channel measurement, each new MS acquires the knowledge such as the channel signal-to-interference-and-noise-ratio (SINR) from all (neighboring) BSs.

Traditionally a new MS picks the BS of strongest SINR. Similarly an active MS may transfer to another cell for stronger SINR. Due to asymmetric MS arrivals and their mobility-induced location shifting, an exceeding number of MSs may select the same cell. Therefore, certain cells may become heavily congested while others under-loaded. Thus the SINR-based cell site selection and handoff may result in regional congestion in certain cells but low resource utilization at the under-loaded cells.

In order to specify a handoff and cell site selection procedure which can provide efficient resource utilization and effective load balancing among all of the cells, it is advantageous to construct a multi-cell system model with the key networking entities and appropriate performance metrics about load balancing. It is then advantageous to formulate the procedures into a problem of iterative optimal channel assignment in multiple cells and approximately solve the issue by incorporating a distributed load-awareness scheme into the procedures in order to keep the complexity low but the practicality high.

It should be noted that the base station which can be a possible candidate for a new serving base station for a mobile station, whether through the process of handoff or cell site selection, is referred to herein as an "active" or "candidate" base station.

LINK MODEL. Assume there are N cells in total and all BSs have the same transmission power $P_{max}$. The ith cell, $\forall i \in \{1, \ldots, N\}$, serves a set of MSs (denoted $\{K_i(t)\}$) at time t. By taking into account the path loss factor, the fast Rayleigh fading, and the slow log-normal shadowing fading, the received downlink signal by MS k can be written as:

$$y_k(t) = \sqrt{P_{max} c\left(\frac{D}{d_{i,k}}\right)^\gamma s_{i,k}(t)} \; h_{i,k}(t) x_{i,k}(t) + \sum_{j=1, j\neq i}^{N} \sqrt{P_{max} c\left(\frac{D}{d_{j,k}}\right)^\gamma s_{j,k}(t)} \; h_{j,k}(t) x_{j,k}(t) + n(t), \quad (1)$$

where $x_{i,k}(t)$ and $x_{j,k}(t)$ are the desired and interfering signal from the serving and non-serving cell, respectively.

n(t) is the complex additive Gaussian white noise (AGWN) with mean 0 and variance $\sigma_n^2$.

$$c\left(\frac{D}{d_{j,k}}\right)^\gamma$$

denotes the path loss at the light-of-sight (LOS) distance $d_{j,k}$; D is the radius of each cell; $\gamma$ is the path loss exponent; c is a measured parameter at the cell apex $d_{j,k}=D$.

$h_{j,k}(t)$ is the fast Rayleigh fading, denoted by a zero-mean unit-variance complex Gaussian random variable.

$s_{j,k}(t)$ is the log-normal fading parameter. $10\log_{10}^{s_{j,k}(t)}$ is a zero-mean Gaussian random variable with variance $\sigma_s^2$ in dB.

Consider both inter- and intra-cell interference in the context of a TDM-based downlink shared data channel. The instantaneous SINR from BS i to MS k is as follows:

$$S_{i,k}(t) \triangleq \frac{P_{\max}c\left(\frac{D}{d_{i,k}}\right)^\gamma s_{i,k}(t)|h_{i,k}(t)|^2}{\phi P_{\max}c\left(\frac{D}{d_{i,k}}\right)^\gamma s_{i,k}(t)|h_{i,k}(t)|^2 + \sum_{j=1,j\neq i}^N P_{\max}c\left(\frac{D}{d_{j,k}}\right)^\gamma s_{j,k}(t)|h_{j,k}(t)|^2 + \sigma_n^2}, \quad (2)$$

where $\phi$ is the orthogonality factor characterizing intra-cell interference. Correspondingly the instantaneous supportable channel rate is:

$$r_{i,k}(t) = B\log(1+S_{i,k}(t)), \forall k \text{ and } \forall i, \quad (3)$$

where B is the bandwidth in Hertz.

SYSTEM MODEL. It is assumed without limitation that there is an infinite data backlog for each active MS. It is also assumed that all MSs have the same minimum rate requirement ($m_k$ kbps). At each time slot, the BS of any cell exploits the channel states to opportunistically schedule one and only one binding MS for accessing the shared channel. To guarantee the minimum rate requirement, an admission control algorithm within each cell checks the new MS's quality-of-service (QoS) requirements against resource availability.

Figure 2:
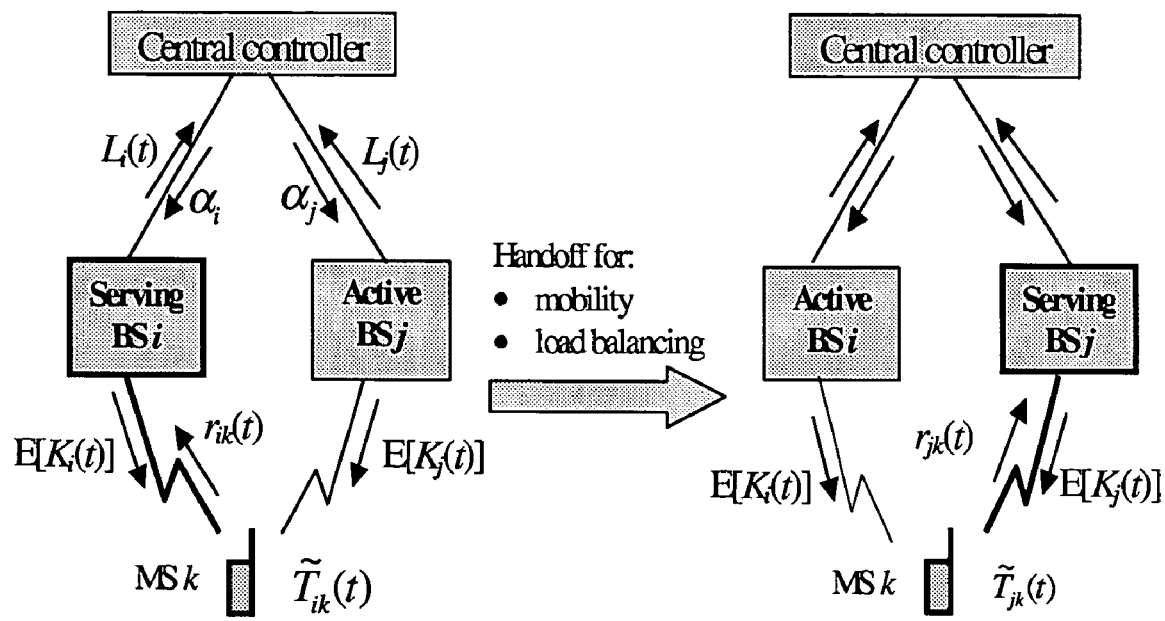
FIG. 2 is a diagram illustrating a handoff procedure in a multi-cell system, in accordance with an embodiment of an aspect of the invention.

FIG. 2 is a diagram illustrating a handoff procedure in a shared channel multi-cell system, where an active MS k is being handed over from its original serving cell i to the new one j. In the presented scheme, at any time slot t, k measures its mean downlink throughput $T_{i,k}$ (suppose k is bound to i at t) as follows:

$$\hat{T}_{i,k}(t) \triangleq \left(1 - \frac{1}{t_c}\right)\hat{T}_{i,k}(t-1) + \frac{1}{t_c}r_{i,k}(t)I_{i,k}(t), \quad (4)$$

where $t_c$ might be set as 1000 time slots, say, in order to get a stable estimation with an acceptable delay. It also measures the instantaneous channel rates (i.e., $r_{i,k}(t)$ and $\forall i$) based on the pilot signals from all BSs. However, it feeds back $r_{i,k}(t)$ only to its serving BS. Each BS maintains a complete list of MSs, e.g., $\{K_i(t)\}$ for BS i, that are receiving services from it.

To assist the admission control, each BS measures its mean aggregate load as follows:

$$E[L_i(t)] \approx E\left[\sum_{k\in\{K_i(t)\}} \frac{m_k}{\tilde{r}_{i,k}(t)}\right], \quad (5)$$

where $$\tilde{r}_{i,k}(t) \triangleq \left(1 - \frac{1}{t_c}\right)\tilde{r}_{i,k}(t-1) + \frac{1}{t_c}r_{i,k}(t)$$

is the measurement of $E[r_{i,k}(t)]$. In this scheme, each BS also broadcasts the mean number of its binding MSs, e.g., $E[K_i(t)]$ for BS i, to all MSs through a control channel. This notifies the MSs about the loading situation in this cell. New MSs may learn this number through signaling.

Within each cell, an opportunistic downlink scheduling algorithm can run independently to pick a binding MS at each time slot. For example and without limitation, it can be advantageous to adopt a scheduling algorithm that is a combination of the Alpha-Rule and the M-LWDF scheduling. See U.S. Utility patent application Ser. No. 10/731,962, "SCHEDULING METHOD WITH TUNABLE THROUGHPUT MAXIMIZATION AND FAIRNESS GUARANTEES IN RESOURCE ALLOCATION," filed on Dec. 10, 2003; M. Andrews et al., "Providing Quality of Service over a Shared Wireless Link," IEEE Communi. Mag., pp. 150-54, February, 2001, the contents of which are incorporated by reference herein. A BS i schedules MSs by picking $$k^*(t) = \arg\max_{k\in\{K_i(t)\}} \left\{w_{i,k}\frac{r_{i,k}(t)}{T_{i,k}^{\alpha_i}}\right\}, \quad (6)$$

where $0\leq\alpha_i$ is the control knob to the tradeoff between per-user fairness and aggregate throughput. $T_{i,k}$ is estimated by $\hat{T}_{i,k}(t)$. The design of $w_{i,k}$ following the M-LWDF scheme is the length of a token-bucket queue, where token arrives at the rate of $m_k$ but departs at k's actual transmission rate. The inventors refer to this scheme as the weighted Alpha-Rule of minimum rate guarantees. Where the parameter $\alpha_i$ is set to $\alpha_i=1$, one gets the same fairness as Proportional Fair scheduling. See P. Viswanath et al., "Opportunistic Beamforming using Dumb Antennas," IEEE Trans. on Inform. Theory, Vol. 48, No. 6, pp. 1277-94, June, 2002; A. Jalali, et al., "Data Throughput of CDMA-HDR a High Efficiency-High Data Rate Personal Communication Wireless System," in Proc. IEEE Veh. Technol. (VTC), pp. 1854-58, May, 2000.

An advantageous admission control scheme can be adopted, such as the one disclosed in S. Das et al., "Dynamic Load Balancing through Coordinated Scheduling in Packet Data Systems," in Proc. IEEE INFOCOM, San Francisco, April, 2003, which is incorporated by reference herein. In each cell (i, say), the BS accepts a new MS (l, say) or an MS handoff request if and only if the following condition holds:

$$\sum_{\forall k\in\{K_i(t)\}} \frac{m_k}{E[r_{i,k}(t)]} + \frac{m_l}{E[r_{i,l}(t)]} < 1, \quad (7)$$

where $E[r_{i,k}(t)]$ and $E[r_{i,l}(t)]$ can be measured by i based on channel feedback. It says that the total load after accepting l should not exceed the full "capacity" 1. This scheme is conservative for the lack of multiuser diversity gain in defining the load. The rejection of a newly arrived MS will be counted into the blocking rate of i and of the whole system.

OPTIMAL ASSIGNMENT PROBLEM. The multi-cell system can now be described from the point of view of network economy. Given N base stations and K mobile stations, ideally at each time slot the system would assign to each BS i ($\in N=\{1, \ldots, N\}$) only one MS k ($\in K=\{1, \ldots, K\}$). An MS can not be assigned twice simultaneously, i.e., it receives services from only one BS at most at any time. The optimal assignment proceeds with time, aiming to maximize the long-term revenue $$R = \sum_{k=1}^{K} U_k(T_k), \quad (8)$$

where $U_k$ is a non-decreasing concave utility function of the mean throughput $T_k$ of MS k. Therefore, the problem is to find the optimal assignment that maximizes R at each time slot. See S. Shenker, "Fundamental Design Issues for the Future Internet," IEEE J. Select. Areas Commun., Vol. 13, No. 7, pp. 1176-88, September, 1995.

Define an assignment indicator variable $$I_{i,k}(t) = \begin{cases} 1, & \text{if the } k\text{-th } MS \text{ is assigned to } BS \ i \text{ at time } t \\ 0, & \text{otherwise} \end{cases}$$

Then the assignment can be denoted by a stochastic decision process $I \equiv \{I_{i,k}(t), i=1, \ldots, N, k=1, \ldots, K, \forall t \geq 0\}$, where at any fixed t, the non-zero decision elements in the decision vector $I(t) \equiv \{I_{i,k}(t), i=1, \ldots, N, k=1, \ldots, K\}$ is in $\mathbf{I} \equiv \{1, 2, \ldots, K\}^N$, denoting the picking of a MS (out of K MSs) by each BS (of N BSs). The optimization problem is thus the assignment problem:

$$\max_I R = \sum_{k=1}^{K} U_k(T_k(I)), \text{ s.t.} \sum_{k=1}^{K} I_{i,k}(t) = 1, \forall \ i = 1, \cdots, N, \quad (9)$$

$$\sum_{i=1}^{N} I_{i,k}(t) \leq 1, \forall \ k = 1, \cdots, K.$$

The first constraint says that each BS (i) can only pick one MS (k) and the second constraint says that each MS (k) can be picked by at most one BS at any time. With ergodic assumption, the long-term mean throughput $T_k$ of MS k up to time t is $$T_k(t) = \frac{1}{t} \sum_{\tau=1}^{t} \sum_{i=1}^{N} r_{i,k}(\tau) I_{i,k}(\tau). \quad (10)$$

Therefore, the optimal assignment I(t) at time t may proceed along the gradient ascent:

$$I^*(t) = \arg\max_{I(t) \in \mathbf{I}} \frac{dR(t)}{dt} = \arg\max_{I(t) \in \mathbf{I}} \sum_{k=1}^{K} \frac{\partial U_k(T_k(t))}{\partial T_k} \frac{dT_k(t)}{dt}. \quad (11)$$

Assume the size of the time slot $\Delta t$ is small. Then $$\frac{dT_k(t)}{dt} \approx \frac{1}{t\Delta t}\left[\sum_{i=1}^{N} r_{i,k}(t) I_{i,k}(t) - T_k(t-\Delta t)\right].$$

Neglecting $t\Delta t$ and $T_k(t-\Delta t)$ that are independent of the t-moment decision variable I(t), we have $$I^*(t) = \arg\max_{I(t) \in \mathbf{I}} \sum_{k=1}^{K} \sum_{i=1}^{N} \frac{\partial U_k(T_k(t))}{\partial T_k} r_{i,k}(t) I_{i,k}(t), \quad (12)$$

where $I(t) = \{I_{i,k}(t), i=1, \ldots, N, k=1, \ldots, K\}$ follows the same optimization constraints. Therefore, the assignment problem requires maximum weight perfect matching between BS set and MS set, where the nonnegative weight is $$\frac{\partial U_k(T_k(t))}{\partial T_k} r_{i,k}(t).$$

This problem can be approximately solved by what is known in the art as the Hungarian Method in a polynomial time. See C. H. Papadimitriou and K. Steiglitz, "Combinatorial Optimization: Algorithms and Complexity," Dover Publications, Inc., Mineola, N.Y., 1998. Note that an exhaustive search takes $O(K^N)$ steps.

DISTRIBUTED APPROXIMATION. The above formulation allows full sharing of system resources among all MSs, and thus it has an inherent functionality of load balancing. However, the solution requires global knowledge of the system and is centrally computed for each time slot. Therefore, it is not feasible in practice. Reducing the overhead by approximation, a suboptimal solution may be obtained in two stages.

The first stage decides a long-term dynamic binding between each MS and an exclusive BS. It partitions K into N non-overlapping subsets $\{K_i(t)\}$, i=1, ..., N.

The second stage solves the assignment issue at each time slot within each independent subset where only one BS (N=1) exists. It actually implies an instantaneous intra-cell opportunistic scheduling introduced before, where $$U_k(T_k) = \omega_k \frac{T_k^{1-\alpha}}{1-\alpha},$$

The first stage considers the frequent coming and leaving of MSs in different cells, which is naturally tied to the handoff and cell-site selection process.

As stated before, a newly arrived MS k may select the serving BS by closest-radio (SINR):

$$i^* = \arg\max_{i \in B_k} \{E[S_{i,k}(t)]\}, \quad (13)$$

where $E[S_{i,k}(t)]$ can be estimated as, say, $$\tilde{S}_{i,k}(t) \triangleq \left(1 - \frac{1}{t_c}\right)\tilde{S}_{i,k}(t-1) + \frac{1}{t_c} S_{i,k}(t-1).$$

Note that we may replace $S_{i,k}(t)$ using $r_{i,k}(t)$ and get the same performance. The inventors refer to this scheme as SINR-CSS, a distributed but purely physical-layer scheme.

In contrast, and in accordance with an embodiment of an aspect of the invention, a distributed scheme can be derived based on the utility formulation. Suppose a new MS k may estimate the net gain of utility, if it is bound to BS i at time t, as follows:

$$\Delta R_{i,k}(t+1) = U_k(T_{i,k}(t+1)) - \sum_{l \in \{K_i(t)\}} [U_l(T_{i,l}(t)) - U_l(T_{i,l}(t+1))]. \quad (14)$$

Note that MS k is competing for the shared channel resources in cell i against all the other MSs in $\{K_i(t)\}$, so $T_{i,l}(t)$ is reduced to $T_{i,l}(t+1)$. Hence, k has to locate the BS i* with $$i^* = \arg\max_i \{\Delta R_{i,k}(t+1)\}. \quad (15)$$

In practice, k is independent of other MSs, i.e., $T_{i,l}(t)$ ($\forall l \in \{K_i(t)\}$ and $l \neq k$) are unknown to k. On the other hand, when the size of $\{K_i(t)\}$ is big, we may neglect the impact of k on the aggregate utility. Thus at time t, k needs to locate the BS i* with $$i^* = \arg\max_i \{U_k(T_{i,k}(t+1))\}. \quad (16)$$

Since MS k is new to BS i, $T_{i,k}(t+1)$ can only be estimated by k using $$\frac{E[\tau_{i,k}(t)]}{E[K_i(t)] + 1}.$$

Thus, a distributed decision scheme is obtained, which the inventors refer to as a load-aware cell-site selection.

In accordance with a preferred embodiment of this aspect of the invention, load-aware cell-site selection proceeds as follows:

$$i^* = \arg\max_{i \in B_k} \left\{ \frac{E[\tau_{i,k}(t)]}{E[K_i(t)]} \right\}, \quad (17)$$

where $B_k$ is the active set of BSs from which k picks its serving BS. $E[K_i(t)]$ is estimated by BS i and advertised to k through signaling channel, while $E[r_{i,k}(t)]$ is measured by k from pilot channel signals as illustrated in FIG. 2. Intuitively this scheme allows new MSs to avoid selecting hot-spots, and thus has an implicit load balancing effect across the whole system in a distributive manner.

Adopting the same concept in the handoff procedure, each MS can run proactively what the inventors refer to as a load-aware handoff procedure, which is illustrated by FIG. 2. By this scheme, a switchover from BS i to j is triggered once k detects $$\max\left\{ \frac{E[\tau_{i,k}(t)]}{E[K_i(t)]}, \tilde{T}_{i,k}(t) \right\} < \Gamma_{j^*,k} = \max_{j \in B_k} \left\{ \frac{E[\tau_{j,k}(t)]}{E[K_j(t)] + 1} \right\}, \quad (18)$$

where all components can be measured at k according to the system model described above. This scheme allows active MSs to asynchronously respond to changes of physical channel due to mobility and changes of its throughput due to random ON/OFF of other MSs across the whole system.

In the load-aware handoff scheme, $\tilde{T}_{i,k}(t)$ is to calibrate $$\frac{E[\tau_{i,k}(t)]}{E[K_i(t)]},$$

the estimation of per-user throughput that assumes an equal sharing of time slots among all users as the weighted Alpha-Rule does when $\alpha=1$, which is basically identical to the weighted version of Proportional Fair scheduling. Note that this estimation tends to be conservative for lack of multiuser diversity gain.

$$\frac{E[\tau_{j,k}(t)]}{E[K_j(t)] + 1}$$

serves as a prediction about the future $T_{j,k}(t)$ because the actual throughput $T_{j,k}(t)$ remains unknown before the switchover. $E[K_j(t)]+1$ helps avoid the Ping-Pong phenomenon of frequent switchovers. Similar to load-aware cell-site selection, the load-aware handoff scheme has an inherent load balancing effect.

To improve the stability and to limit the overhead in our scheme, it is preferable that an MS k be allowed to do load-aware handoff only periodically. The period, denoted $t_h$, may depend on its moving speed, or may be fixed (say, 600 time slots or 1 second in HDR systems). In practice each MS keeps a timer that independently counts down to zero before reset to $t_h$ again. The timer starts from $t_h$ for new MSs, while the asynchronous ON (or arrival) time of new MSs helps avoid isochronous load-aware handoff among MSs. Note that in the above scheme, if j* can not accept the handoff requests from k, k stays where it is. It is reasonable because load-aware handoff is only a "soft" request for better performance instead of being a forced switchover. A forced handoff, induced by minimum rate violation or physical channel condition below certain pre-configured threshold, is not of concern here.

Figure 3:
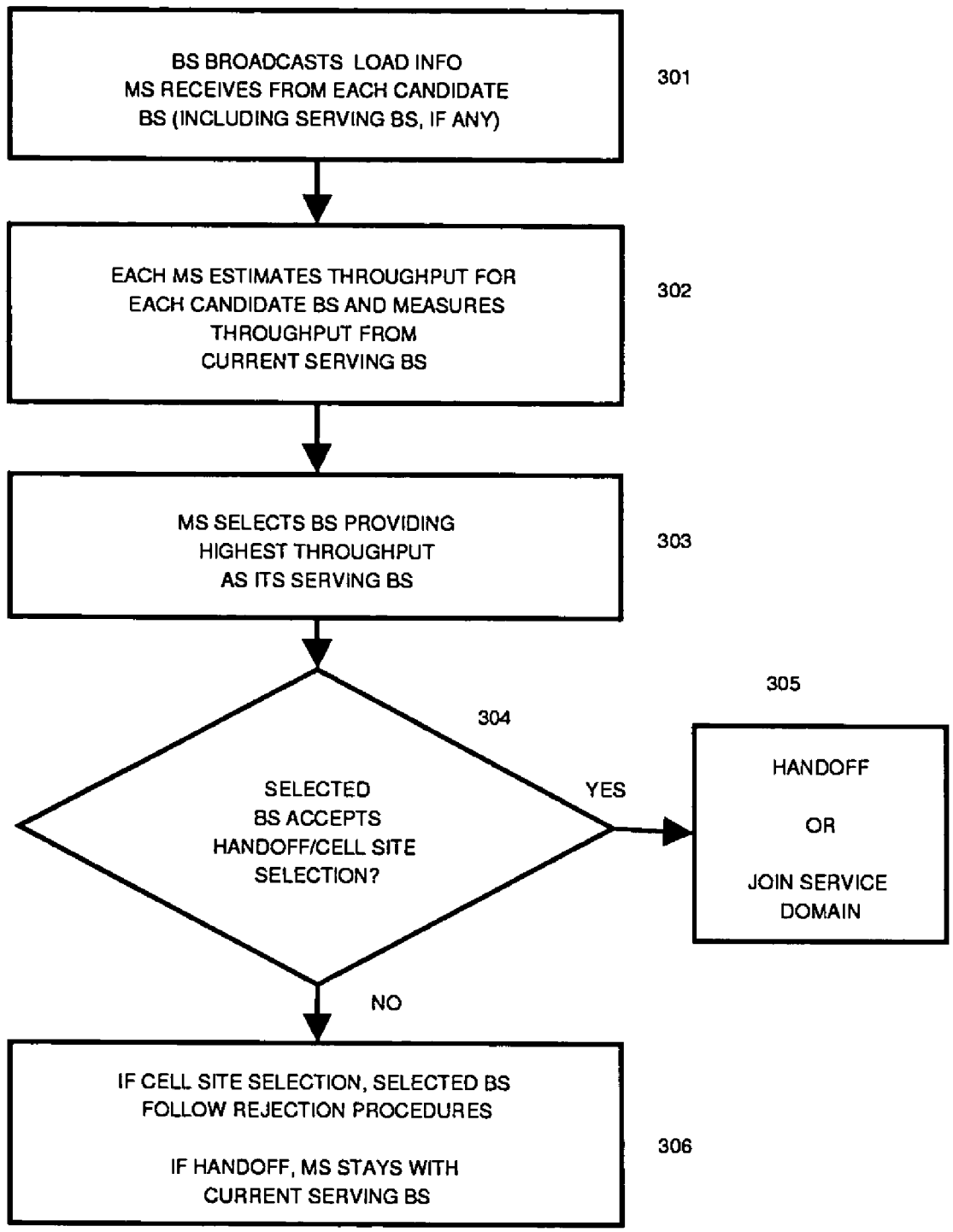
FIG. 3 is a flowchart of processing performed by a mobile station in accordance with an embodiment of the invention.

FIG. 3 is a flowchart of processing performed by a mobile station, illustrating the above-described preferred embodiment of an aspect of the invention. The mobile station is assumed to be in communication with a particular active set of base stations.

At step 301, the mobile station receives a broadcast of load information from each active base station including the serving base station, if any. The load information, for example, can be denoted by the number of existing MSs within the corresponding cells and can be broadcast through the pilot or signal channel periodically at each time slot.

At step 302, the (new or existing) mobile station makes an estimate of its throughput for each candidate base station, e.g., say the mean channel rate divided by the number of mobile stations from each base station. The mobile station also preferably measures the throughput from the serving base station, if any. Then, at step 303, the mobile station selects the base station providing the highest throughput as its (next) serving base station. For a new mobile station, this is the load-aware cell-site selection procedure, and is executed at the very beginning of the new mobile station's arrival (say, when a cellular telephone is turned ON) through signaling. For an existing mobile station, this is the load-aware handoff and is executed periodically by the mobile station, as mentioned above. Both procedures are advantageously done in a distributive manner at each mobile station, assisted by the "load" information from all of the base stations.

If the base station accepts the handoff or cell site selection, at step 304, then the handoff proceeds at step 305—or the mobile station is allowed to join the service domain.

The base station may not be able to accept a handoff request from some mobile station which is being served by another base station. In this case, at step 306, the mobile station will simply stay where it is (or it may follow other procedures, such as select another base station in descending order by the estimated throughput). In contrast, a new mobile station which is rejected for cell site selection would be counted into the blocking rate. In such a situation, it may really be denied for service, or it may follow some other advantageous procedure. For example, it may issue a new request to another base station in a descending order by the estimated throughput.

The issue of load balancing in a multi-cell system of high-speed downlink shared channels is essentially an efficient tradeoff between smaller blocking rate, higher throughput, and better QoS (minimum rate) guarantees. Since revenue most likely comes from the number of satisfied users such systems can support with fixed resources, the blocking rate should be an important metric. The above-described load-aware scheme helps reduce the MS blocking and maximize the resource utilization within the system.

With this scheme, the aggregate throughput generally remains stable. When the load is reasonably heavy, a good load balancing scheme shifts "redundant" users from congested cells to under-loaded ones. The associated improvement of average channel quality in the congested cells and multiuser diversity gain in the under-loaded ones may prevail, improving the throughput of the whole system. Otherwise, the deterioration of the average channel quality for accommodating more edge MSs in the less congested cells may dominate, slightly lowering the overall throughput. However, no matter what, the total blocking rate will be reduced significantly, featuring the major advantage of the load-aware handoff and cell site selection.

The control time scales $t_h$ is usually an engineering tuning knob. MSs may set their $t_h$ independently. Generally speaking, this scheme incorporates a cross-layer coordination among system load balancing, distributed BS-MS binding and MS handoff with the assistance from physical and MAC layer measurements. Due to its distributed nature the scheme is flexible and scales well with the system size and traffic loads. In addition, it is very compatible with the current system architecture. In a multiuser and multi-cell system, this cross-layer system level optimization compensates the great efforts to improve the point-to-point spectrum efficiency at the physical layer.

From the system's point of view, a new MS adopting SINR-based cell-site selection is actually selecting the cell whose aggregate load would have the smallest increase among all, regardless of the actual loading level. On the other hand, load-aware cell-site selection considers the existing load of different cells and tries to pick the one whose current aggregate load is the smallest. This has an inherent load balancing impact. For the system as a whole, the maximization of aggregate throughput and the global utility may not coincide, depending on the utility function and the optimization constraints. Similarly, the reduction of blocking rate or an increasing number of satisfied users does not necessarily improve the aggregate throughput. Just for the purpose of throughput improvement, it may be necessary to block some users of bad channel to maximize the spectral efficiency, which is unacceptable in practice. Note that this scheme is independent of the actual distribution of the MS locations. Suppose a higher percentage of users are distributed at the cell boundary, a situation similar to the case when the shadowing fading instead of the path loss dominates the channel, then it may be expected from the present load balancing scheme even larger advantages because the overall quality of active channels is less sensitive to the load-aware cell site selection and handoff.

In our schemes, the load-aware handoff is triggered asynchronously at each MS to avoid global synchronization. It should be noted that the above discussion only adopts the simplest CAC without direct retry and other refinements. The present invention, nevertheless, is completely compatible with efforts to consider the forced handoff due to channel downgrading below a certain threshold and similar efforts.

PERFORMANCE. The inventors have found it useful to adopt three metrics to evaluate the multi-cell system performance. From the customers' point of view, the minimum rate guarantee is expected in exchange for a flat-rate charging. From the service providers' point of view, the system resource is better utilized given a smaller blocking probability of MS arrivals. Without compromising the minimum rate requirements, the more users the system can accommodate, the more revenue it may generate. Therefore, the number of "satisfied" users or the blocking probability is the most important metrics. As usual, another important metric is the aggregate downlink throughput. Later, it can be seen that limited to the geographic distribution of MSs and the associated signal strength, more satisfied users may imply a higher aggregate throughput provided the system is under-utilized. Otherwise there may be a tradeoff between the two metrics. The last metrics is the load balancing effect across multiple cells, characterized by congestion mitigation and robustness to asymmetric traffic arrivals.

To test the performance of the present scheme, we define a pair of (LA-CSS, LA-HO) to differentiate the SINR-based schemes and the present load-aware schemes for load-aware cell site selection (LA-CSS) and load-aware handoff (LA-HO), where 1 denotes ON and 0 OFF of the load-awareness. Note that (0, 0) means purely SINR based cell site selection and handoff. In each of the tests, MSs have the same minRate. The signal strength of new MSs is

TABLE 1

Parameter setting in the performance test.

| $P_{max}$ | $\sigma_s$(dB) | $\gamma$ | c(dB) | $\phi$ | B(MHz) | $t_H$(slots) |
|---|---|---|---|---|---|---|
| 1 | 4 | 3.7 | 20 | 0.01 | 1.25 | 500 | determined by log-normal shadow fading and path loss from BSs to the uniformly distributed position of each MSs. With a separation of time scales, it is assumed that MSs are fixed after arrival but are subject to fast Rayleigh fading. Note that the uniform distribution within each hexagonal cell represents the worst case for load balancing effect that would otherwise be more prominent if more MSs are located at cell boundaries or with more dominating shadow fading.

In a multi-cell system as FIG. 1, the active set for each MS is defined as the set of all cells. Each cell has an omnidirectional antenna. Each time slot is 1.667 ms, following CDMA HDR systems. Initially $K_i(t)$ is set as 1 to make the cell-site selection metrics $$\frac{E[\tau_{i,k}(t)]}{E[K_i(t)]}$$

valid. In (2) we assume memoryless Rayleigh fading and neglect the AWGN factor $\alpha_n^2$. For other parameters in (3) and (2) please refer to Table 1.

TWO-TIER SYSTEM. Consider a two-tier system, where minRate is 28.8 kbps;

$$\frac{1}{\mu} = 20s;$$

Figure 4:
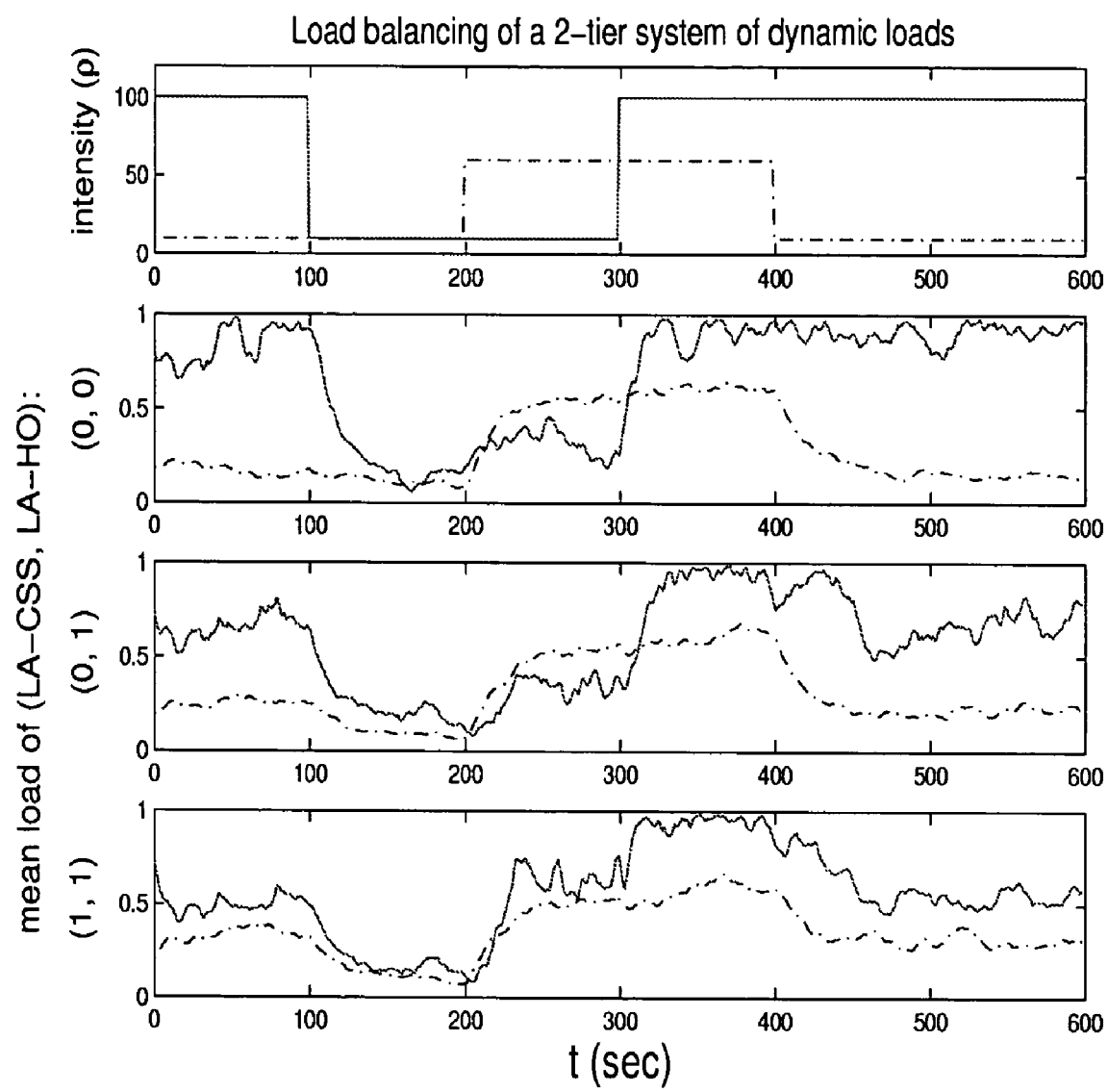
FIGS. 4 and 5 are charts showing the dynamics of a two-tier system with or without using load-aware cell site selection and handoff.
Figure 5:
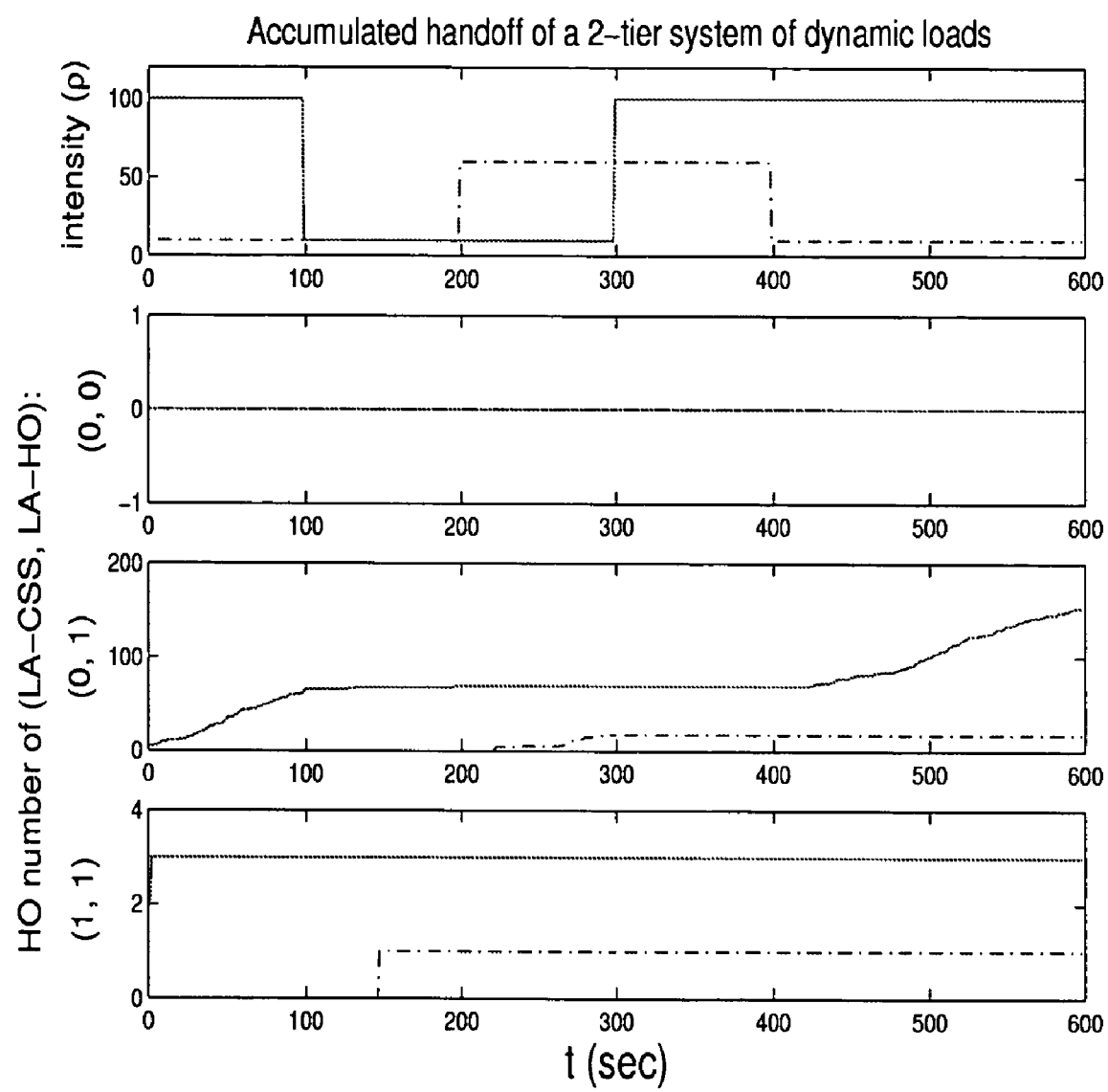

$\rho$ of each tier artificially oscillates with time, as shown by the first subplot of FIGS. 4 and 5.

FIG. 4 shows the load balancing effect when (LA-CSS, LA-HO) takes (0, 0), (0, 1), and (1, 1), respectively. Note that (0, 0) actually means the SINR-based legacy schemes without "load awareness". Obviously (0, 0) has no balancing effect at all, as manifested by the close similarity between the input intensity pattern and the measured mean load of each tier. In contrast the other two setups, (0, 1) and (1, 1), all demonstrate a load balancing effect by shifting mean loads from heavily loaded tier to the lighted loaded one. In other words, the mean loads of the two tiers are getting closer over time than their value intensity $\rho$.

FIG. 5 shows the system dynamics in terms of accumulated handoff number over time. With (0, 0), there is no handoff because the mean SINR of MS-BS channels is fixed in our test. Thus the initial cell site selection remains optimal throughout the life time of each channel (i.e., each active MS). Therefore, cells are totally isolated and have to handle their loads independently. Comparatively both (0, 1) and (1, 1) trigger load-aware handoff to shift MSs away from hot-spots, and thus enable resource sharing among cells. (1, 1) has less handoff events than (0, 1) because LA-CSS preempts most LA-HO events in our tests. However, LA-CSS does not invalidate LA-HO because in practice an MS, especially the one of high mobility, is subject to a constant changing environment after its cell-site selection.

THREE-TIER SYSTEM. Now let us scale up the tests to a three-tier multi-cell system with heavy loads at the second tier (tier 1), i.e., the middle circle of the rings of cells in FIG. 1. Similarly we fix $\rho_1$=60 and $\rho_2$=20 while testing $\rho_0$ in the range of [1, 120].

Figure 6:
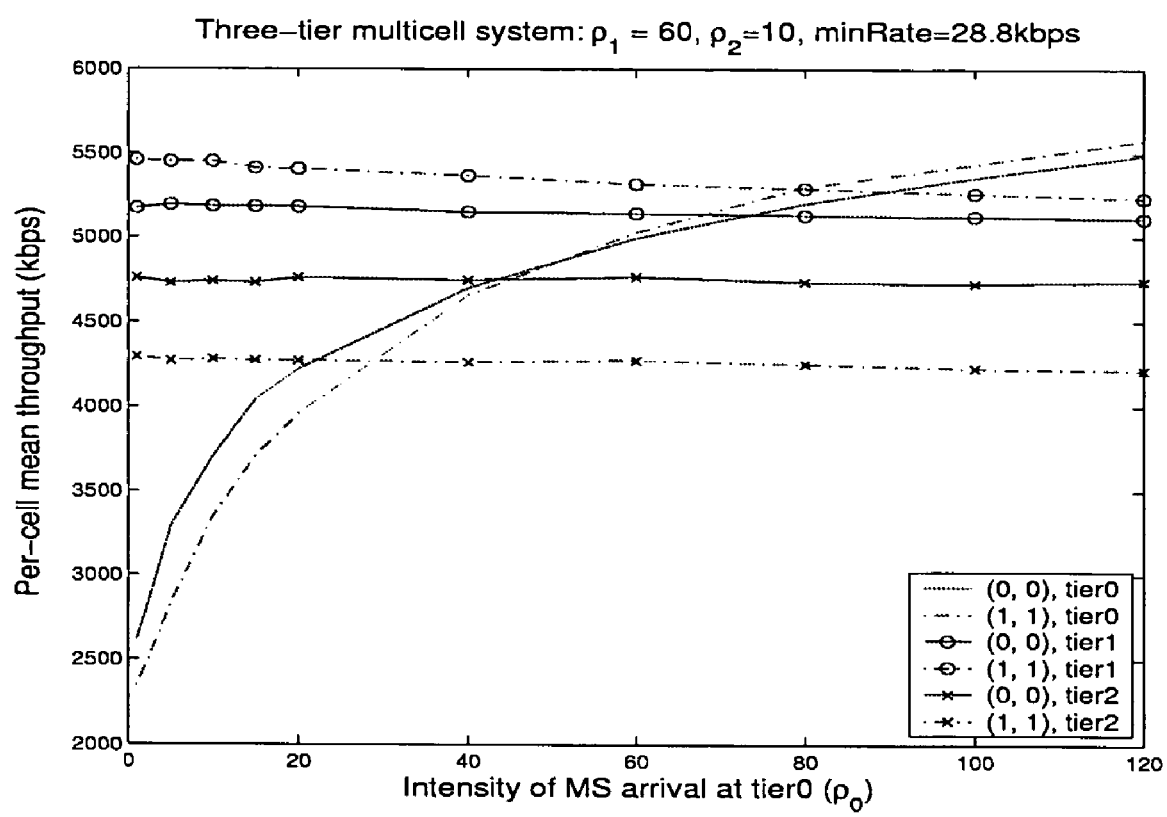
FIG. 6 is a chart showing the per-cell mean throughput with different load balancing schemes with $(\rho_1, \rho_2)=(60, 10)$.

As we can see from FIG. 6, our scheme (1, 1) consistently improves per-cell throughput at the congested tier 1 because its load can be shifted to the less congested tier 2 or tier 0 (when $\rho_0$ is small). However, the per-cell throughput deteriorates at tier 2 because boundary users originally from tier 1 are now grabbing resources from its strong-channel users, and thus degrading the overall mean channel quality and cell throughput. In other words, the detrimental impacts of load balancing on mean channel quality may overwhelm the associated improvement of multiuser diversity gain especially when the gain is close to saturation. For the same reason, our scheme either improves tier 0's mean throughput (when $\rho_0 \leq \rho_1$) or degrades it (when $\rho_0 \geq \rho_1$), reflecting the direction of load shifting between tier 0 and 1.

Figure 7:
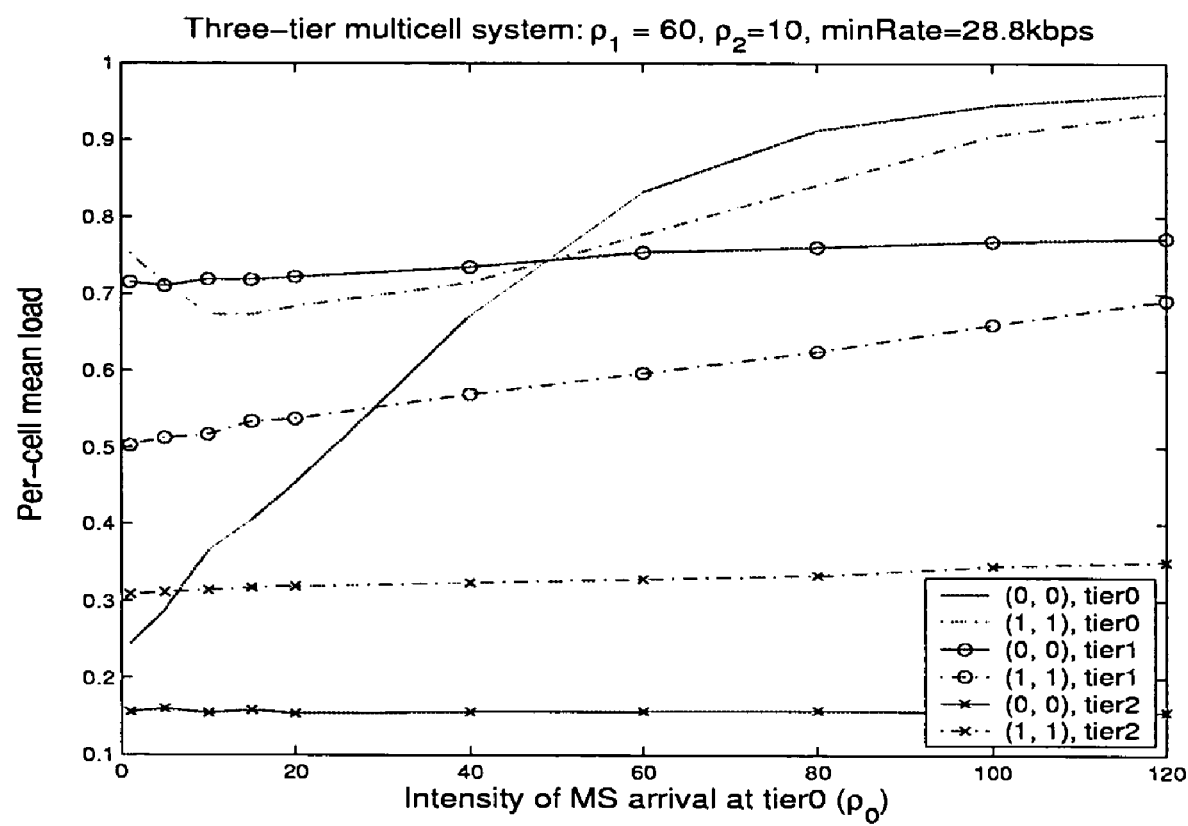
FIG. 7 is a chart showing the per-cell load with different load balancing schemes with $(\rho_1, \rho_2)=(60, 10)$

Similar to the two-tier case, loads of the three tiers are more balanced with (1, 1) than (0, 0), as manifested through the smaller gaps among the three tiers in FIG. 7, i.e., the gaps among broken lines versus the gaps among solid lines. Clearly the load increase of tier 0 gradually reverses the direction of load shifting between tier 0 and tier 1 and thus the improvement of tier 0's throughput. Tier 1 consistently decreases because it can always shift loads to tier 2 no matter which one of $\rho_0$ and $\rho_1$ is higher.

Figure 8:
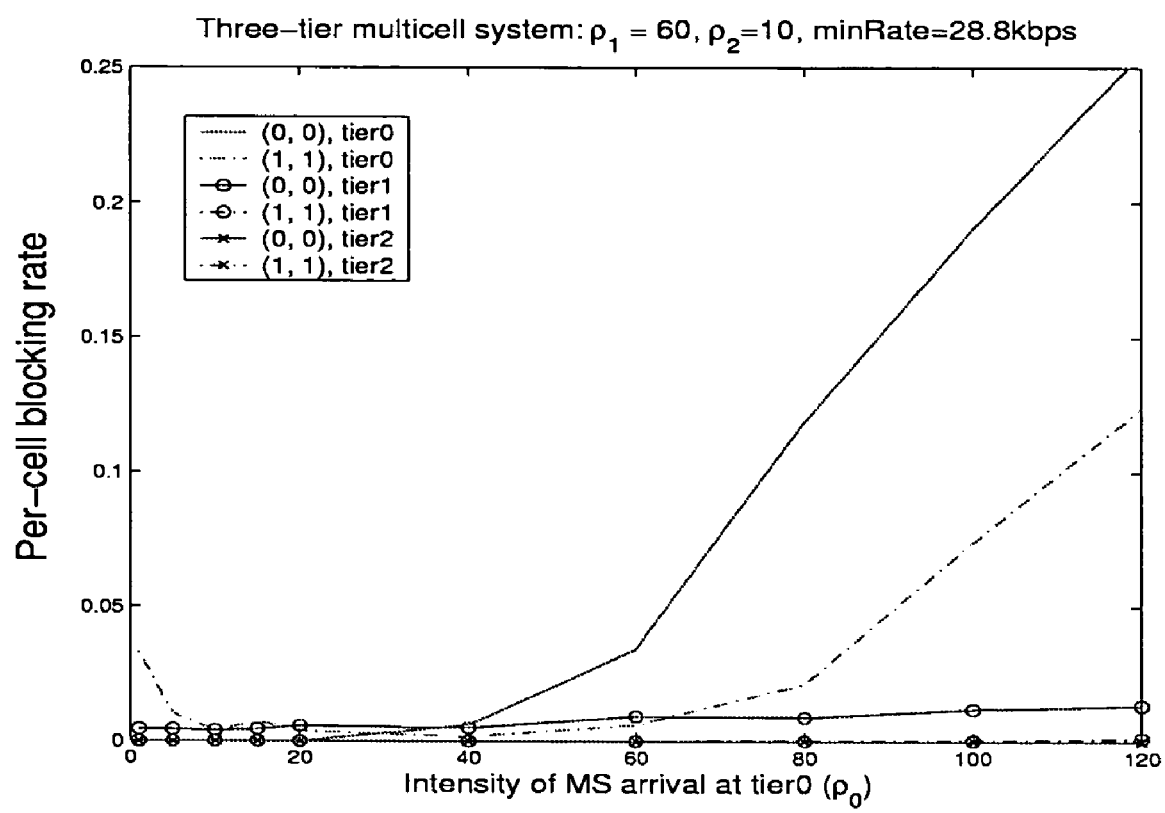
FIG. 8 is a chart showing the per-cell blocking rate with different load balancing schemes with $(\rho_1, \rho_2)=(60, 10)$.
Figure 9:
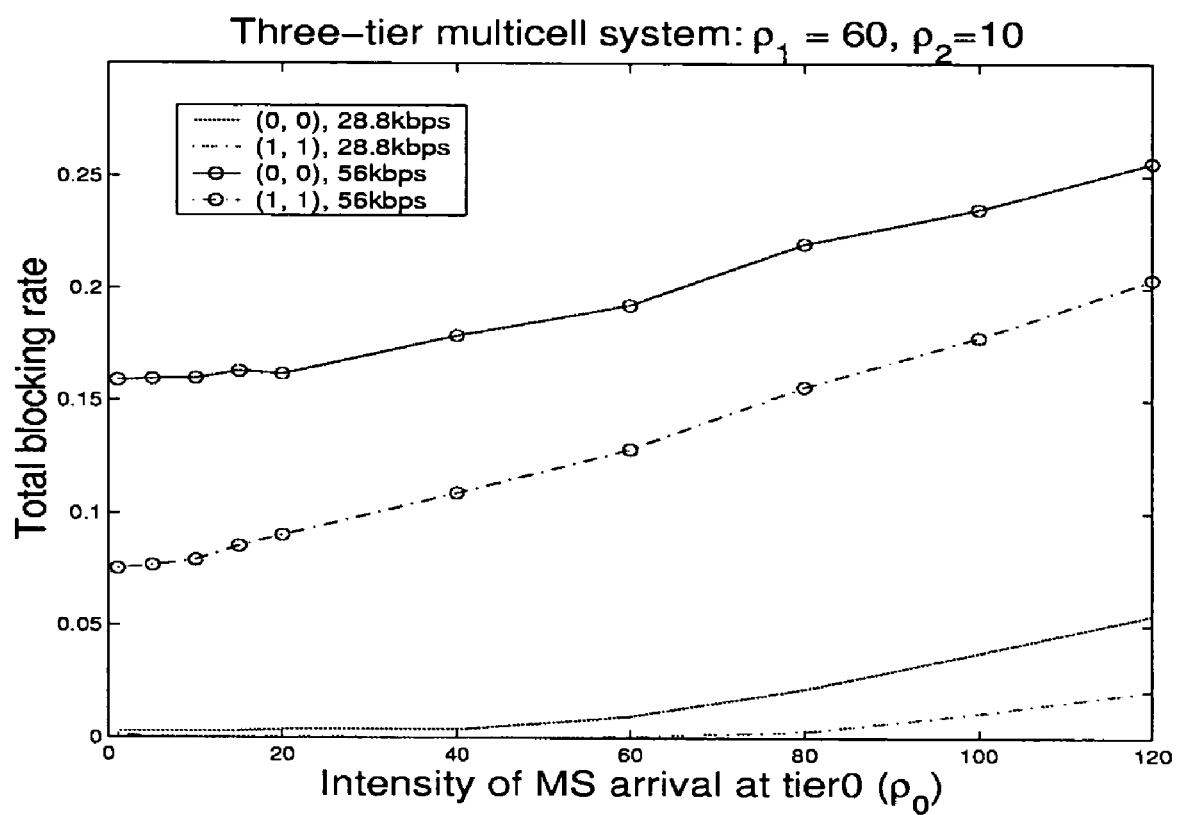
FIG. 9 is a chart showing a three-tier system blocking rate with different load balancing schemes with $(\rho_1, \rho_2)=(60, 10)$.

As another performance metrics, per-ell blocking probability at all tiers almost unanimously decreases from (0, 0) to (1, 1), as FIG. 8 shows, reflecting an effective load balancing. A special case is tier 0 with (1, 1) when $\rho_0$ is very small because too many edge MSs (of poor channels) shifted from tier 1 will raise the load of tier 0 even higher than tier 1. Since the total number of admitted MSs in tier 0 accounts for only a very small percentage of all MSs in the system, this local degrade of blocking rate has negligible effect on the total blocking rate. We can actually see from FIG. 9 the significant improvement (by as much as 50% or more) of the total blocking rate from (0, 0) to (1, 1).

Figure 10:
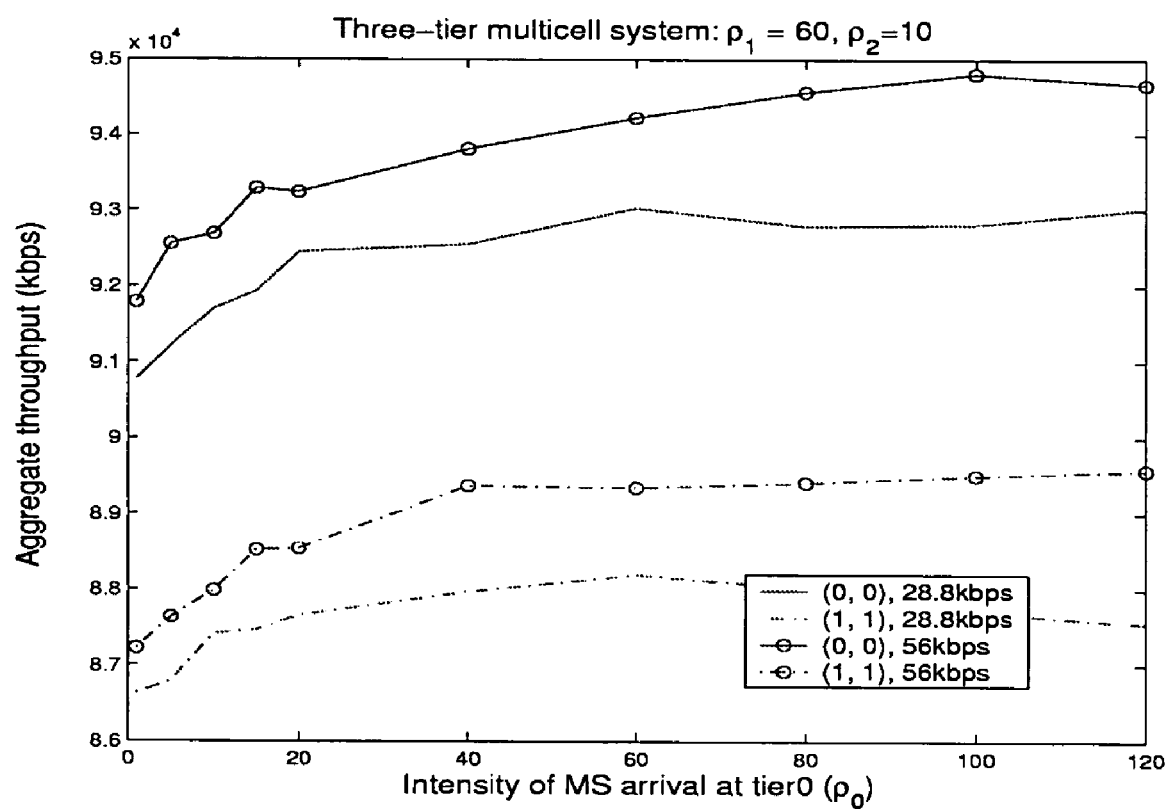
FIG. 10 is a chart showing a three-tier throughput with different load balancing schemes with $(\rho_1, \rho_2)=(60, 10)$.

FIG. 10 shows that the aggregate throughput degrades (only trivially) with our scheme because it enables the system to accommodate more users, while most of them being located at the cell boundary and thus degrade the overall channel qualify of the system. However, the negligible side impact on the aggregate throughput only emphasizes the significant gain of blocking rate in FIG. 9. The multi-cell system as a whole will benefit from load balancing for accommodating more satisfied users, which will boost the system revenue in general.

In summary, evaluations show that the presented load balancing scheme is indeed effective in reducing congestions and increasing resource utilization across the system. The per-cell throughput improvement depends on specific scenarios, reflecting the inherent tradeoff between more satisfied MSs and better channel quality in the system. In general the gain exceedingly over-shadows the loss.

The dilemma in such systems is as follows: On the one hand, there is no physical-layer power control or MAC-layer soft-handoff. On the other hand, inter-cell interference and asymmetric load distribution in multiple cells are hindering the global system performance, which traditionally requires the dynamic power control or soft-handoff. The present load-awareness concept in handoff and cell-site selection acts as an answer to this dilemma. The present scheme potentially reduces the blocking rate of MSs arrivals across the whole system by 50% or more. It also increases system utilization and mitigates regional congestions. Due to the geographical location of MSs and the inevitable path loss, a load balancing scheme may increase the number of satisfied user, but may slightly decreases the system throughput. That is the fundamental tradeoff, but the inventors believe that the gain overwhelms the loss. Evaluations show that the scheme is robust to asymmetric and dynamic traffic arrivals, and requires very limited changes to the existing system architecture.

Previous work notably resorts to the coupling of power control and handoff/cell site selection to handle the load balancing and inter-cell interference provided the system is circuit-switched. See S. V. Hanly, "An Algorithm for Combined Cell-Site Selection and Power Control to Maximize Cellular Spread Spectrum Capacity," IEEE J. Select. Areas Commun., Vol. 13, No. 7, pp. 1332-40, September, 1995; R. Yates et al., "Integrated Power Control and Base Station Assignment," IEEE Trans. on Veh. Technol., Vol. 44, No. 3, pp. 638-44, August, 1995. This scheme is not applicable in high-speed shared channel systems where fast power control and soft handoff are disabled. Another legacy approach as adopted in Qualcomm's systems does load balancing by manipulating the power level of common pilot channel: the level is advertised as lower than the actual in congested cells; as a result MSs will switch to other cells in search for a strongest signal. See TIA/EIA IS95 Standard, "Mobile Station-Base Station Compatibility Standard for Dual-Mode Wideband Spread Spectrum Cellular System," 1995 (IS-A) and 1999 (IS-B). Thus the load becomes more balanced. This scheme is applicable to the system of shared downlink channel but with side impacts because accurate power information is expected by adaptive modulation and channel strength estimation. A common issue with those previous schemes is that they only consider physical-layer signal quality in decision making. In systems of high-speed shared channel, those schemes are vulnerable to local congestions and fluctuating loads for lack of global system information with individual BSs and MSs. Hence the asymmetric loading at different cells often causes regional congestion and low resource utilization across the whole system.

What is claimed is:

1. A method for cell site selection in a shared channel multi-cell wireless communication network, the method comprising:
   receiving load information from each of a plurality of candidate base stations;
   estimating throughput of the shared channel for each candidate base station using the load information received from each of the plurality of candidate base stations;
   selecting a candidate base station from the plurality of candidate base stations with a highest throughput for the shared channel as a serving base station;
   wherein the load information comprises a number of mobile stations served by the candidate base station in the shared channel multi-cell wireless communication network and the throughput is estimated by dividing the shared channel rate of the candidate base station by the number of mobile stations served by the candidate base station; wherein
   if the candidate base station rejects selection as the serving base station, another candidate base station with a next highest throughout is selected as the serving base station.

2. The method of claim 1 wherein the load information is received in a periodic broadcast from the candidate base stations.

3. A method for handoff in a shared channel multi-cell wireless communication network, the method comprising:
   measuring the throughput of the shared channel from a current serving base station;
   receiving load information from at least one candidate base station;
   estimating throughput of the shared channel for the candidate base station using the load information received from the candidate base station; and
   if the candidate base station has a higher throughput for the shared channel than the current serving base station, then signaling for a handoff selecting the candidate base station as a new serving base station;
   wherein the load information comprises a number of mobile stations served by the candidate base station in the shared channel multi-cell wireless communication network and the throughput is estimated by dividing the shared channel rate of the candidate base station by the number of mobile stations served by the base station; wherein
   if the candidate base station rejects selection as the new serving base station, another candidate base station with a next highest throughout which is higher than the current serving base station is selected as the new serving base station.

4. The method of claim 1 further comprising the step of staying with the current serving base station if the candidate base station cannot accept the handoff.

5. The method of claim 1 wherein the load information is received in a periodic broadcast from the candidate base station.

* * * * *